United States Patent [19]

Best

[11] Patent Number: 4,634,749

[45] Date of Patent: Jan. 6, 1987

[54] POLYMERIZATION CATALYST, PRODUCTION AND USE

[75] Inventor: Steven A. Best, Houston, Tex.

[73] Assignee: Exxon Research & Engineering Co., Florham Park, N.J.

[21] Appl. No.: 777,396

[22] Filed: Sep. 18, 1985

Related U.S. Application Data

[62] Division of Ser. No. 638,168, Aug. 6, 1984, Pat. No. 4,558,025.

[51] Int. Cl.$^4$ .......................... C08F 4/62; C08F 4/64; C08F 4/68; C08F 4/70
[52] U.S. Cl. .................................. 526/124; 526/129; 526/133; 526/142; 526/143; 526/348.6; 526/352
[58] Field of Search ............... 526/124, 129, 133, 134, 526/143

[56] References Cited

U.S. PATENT DOCUMENTS

| 3,787,384 | 1/1974 | Stevens et al. | 526/129 X |
|---|---|---|---|
| 4,252,670 | 2/1981 | Caunt | 526/125 X |
| 4,263,168 | 4/1981 | Rochefort et al. | 526/124 X |
| 4,325,835 | 4/1982 | Hartshorn | 526/114 X |
| 4,435,518 | 3/1984 | Pennington et al. | 526/124 X |
| 4,456,547 | 6/1984 | Fuentes | 526/133 X |

FOREIGN PATENT DOCUMENTS 0032307 7/1981 European Pat. Off. .

Primary Examiner—Patrick P. Garvin
Attorney, Agent, or Firm—M. B. Kurtzman

[57] ABSTRACT

Ethylene and alpha-olefins are homopolymerized or copolymerized with another olefin monomer in the presence of a catalyst system comprising an organo metal cocatalyst and a titanium containing catalyst component, said titanium-containing catalyst component being obtained by reacting together a porous particulate material, an organic magnesium compound, an oxygen containing compound, an acyl halide and titanium tetrachloride and a Group IIIa hydrocarbyl metal dihalide.

19 Claims, No Drawings

POLYMERIZATION CATALYST, PRODUCTION AND USE

This is a division of application Ser. No. 638,168 filed 08/06/84 and now U.S. Pat. No. 4,558,025.

BACKGROUND OF THE INVENTION

This invention relates to a novel catalyst component to be employed with a cocatalyst for use in the polymerization of olefins to polyolefins such as polyethylene, polypropylene and the like and especially in the production of high density and linear low density polyethylene, copolymers such as ethylene copolymers with other alpha-olefins and diolefins, which catalyst component shows unusually high activity and excellent hydrogen response for the control of polymer molecular weight while obtaining improved comonomer response and improved bulk density. The polymer product obtained evidences an important balance of polymer properties, for example, the catalyst system obtains a polymer with good bulk density, a narrow molecular weight distribution and an improved balance in polymer product machine direction tear strength and transverse direction tear strength. As a result, for example, the blown film produced from LLDPE manifests an overall high strength.

The catalyst component comprises a solid reaction product obtained by contacting a solid, particulate, porous support material such as, for example, silica, alumina, magnesia or mixtures thereof, for example, silica-alumina, in stages with a transition metal compound, an organometallic composition treated with an alcohol, an acyl halide and a Group IIIa metal hydrocarbyl dihalide. The novel catalyst component, which when used with an aluminum alkyl cocatalyst, provides the novel catalyst system of this invention which can be usefully employed for the polymerization of olefins.

The catalyst system can be employed in slurry, single-phase melt, solution and gas-phase polymerization processes and is particularly effective for the production of linear polyethylenes such as high density polyethylene and linear low density polyethylene.

Recently, interest has arisen in the use of magnesium-titanium complex catalyst components for the polymerization of olefins. For example, European Patent Application No. 27733, published Apr. 29, 1981 discloses a catalyst component obtained by reducing a transition metal compound with an excess of organomagnesium compound in the presence of a support such as silica and thereafter deactivating the excess organomagnesium compound with certain deactivators including hydrogen chloride.

U.S. Pat. No. 4,136,058 discloses a catalyst component comprising an organomagnesium compound and a transition metal halide compound, which catalyst component is thereafter deactivated with a deactivating agent such as hydrogen chloride. This patent des not teach the use of support material such as silica but otherwise the disclosure is similar to the above-discussed European patent application.

U.S. Pat. No. 4,250,288 discloses a catalyst which is the reaction product of a transition metal compound, an organomagnesium component and an active non-metallic halide such as HCl and organic halides containing a labile halogen. The catalyst reaction product also contains some aluminum alkyls.

Catalyst components comprising the reaction product of an aluminum alkyl-magnesium alkyl complex plus titanium halide are disclosed in U.S. Pat. No. 4,004,071 and U.S. Pat. No. 4,276,191.

U.S. Pat. Nos. 4,173,547 and 4,263,171, respectively disclose a catalyst component comprising silica, an organoaluminum compound, titanium tetrachloride and dibutyl magnesium and a catalyst component comprising a magnesium alkyl-aluminum alkyl complex plus titanium halide on a silica support.

Each of U.S. Pat. Nos. 4,402,861, 4,378,304, 4,388,220, 4,301,029 and 4,385,161 disclose supported catalyst systems comprising an oxide support such as silica, an organomagnesium compound, a transition metal compound and one or more catalyst component modifiers. These patents do not disclose the catalysts of this invention.

In British No. 2,101,610 silica is treated with a magnesium alkyl, an alcohol, benzoyl chloride and $TiCl_4$. In each of Japanese Kokai No. 50-098206 and 57-070107 acyl halides are employed during the preparation of titanium supported catalysts.

The catalyst systems comprising magnesium alkyls and titanium compounds, although useful for the polymerization of olefins such as ethylene and other 1-olefins, often do not show excellent responsiveness to hydrogen during the polymerization reaction for the control of molecular weight, do not readily incorporate comonomers such as butene-1 for the production of ethylene copolymers, do not show an extremely high catalytic activity and obtain polymer product manifesting poor bulk density and film properties which are unbalanced under anisotropic conditions.

In U.S. Pat. No. 4,451,574 issued May 29, 1984 a catalyst system obtained by treating an inert particulate support, such as silica, with an organometallic compound, a titanium halide and a halogen gas is disclosed. Although the catalyst obtains very high activities, there is a need for improving the film properties of polymer product obtained by polymerizing olefins in the presence of the catalyst and to improve the bulk density of polymer product.

In accordance with this invention catalyst combinations have been found which have extremely high catalytic activities and excellent hydrogen responsiveness for the control of molecular weight and obtain polymer product with greatly improved film properties and bulk density. The resins exhibit excellent melt strength with a surprising decrease in power consumption hence an increase in extrusion rates, as well as excellent MD tear strength in excess of 80 g/mil and dart impact strength in excess of 70 g/mil with a 1.0 dg/min and 0.918 g/cc density film.

The new catalyst systems and catalyst component of this invention are obtained by contacting an organometallic compound, an alcohol, an acyl halide, a transition metal compound and a Group IIIa metal hydrocarbyl dihalide in the presence of a oxide support. The catalyst system employing the transition metal containing catalyst component is advantageously employed in a gas phase ethylene polymerization process since there is a significant decrease in reactor fouling as generally compared with catalytic prior art ethylene gas phase polymerization processes thereby resulting in less frequent reactor shut downs for cleaning.

SUMMARY OF THE INVENTION

In accordance with the objectives of this invention there is provided a transition metal containing catalyst component for the polymerization of alpha-olefins comprising a solid reaction product obtained by treating an inert solid support material in an inert solvent sequentially with (A) an organometallic compound of a Group IIa, IIb or IIIa metal of the Periodic Table wherein all the metal valencies are satisfied with a hydrocarbon or substituted hydrocarbon group, (B) an oxygen containing compound selected from ketones, aldehydes, alcohols, siloxanes or mixtures thereof, (C) an acyl halide, (D) at least one transition metal compound of a Group IVb, Vb, VIb, or VIII metal of the Periodic Table, and (E) a Group IIIa metal hydrocarbyl dihalide with the proviso that the inert solid support material can alternatively be treated with (i) the (A) organometallic compound and the (B) oxygen containing compound simultaneously, (ii) the reaction product of the (A) organometallic compound and (B) oxygen containing compound or (iii) the (B) oxygen containing compound followed by treating with the (A) organometallic compound.

The solid transition metal containing catalyst component when employed in combination with a cocatalyst such as an alkyl aluminum cocatalyst provides a catalyst system which demonstrates a number of unique properties that are of great importance in the olefin polymerization technology such as, for example, extremely high catalytic activity, the ability to control the molecular weight during the polymerization reaction as a result of the improved responsiveness to hydrogen, increased polymer yield, and especially improved comonomer response and reduced reactor fouling. The polymer product obtained from the polymerization of olefins and particularly ethylene manifests improved bulk density, melt strength and tear strength.

In a preferred embodiment of the invention the (A) organometallic compound is a dihydrocarbon magnesium compound represented by $R^1MgR^2$ wherein $R^1$ and $R^2$ which can be the same or different are selected from alkyl groups, aryl groups, cycloalkyl groups, aralkyl groups, alkadienyl groups or alkenyl groups having from 1 to 20 carbon atoms, the (B) oxygen containing compounds are selected from alcohols and ketones represented by the formula $R^3OH$ and $R^4COR^5$ wherein $R^3$ and each of $R^4$ and $R^5$ which may be the same or different can be an alkyl group, aryl group, cycloalkyl group, aralkyl group, alkadienyl group or alkenyl group having from 1 to 20 carbon atoms, the (D) transition metal compound is preferably a transition metal compound or combination of transition metal compounds represented by the formulas $TrX'_{4-q}(OR^6)_q$, $TrX'_{4-q}R_q^7$, $VO(OR^6)_3$ and $VOX'_3$ wherein Tr is a transition metal of Groups IVb, Vb, VIb, VIIb and VIII and preferably titanium, vanadium or zirconium, $R^6$ is an alkyl group, aryl group, aralkyl group, substituted aralkyl group having from 1 to 20 carbon atoms and 1,3-cyclopentadienyls, X' is halogen and q is zero or a number less than or equal to 4, and $R^7$ is an alkyl group, aryl group or aralkyl group having from 1-20 carbon atoms or a 1,3-cyclopentadienyl. In a particularly preferred embodiment of the invention the (A) organometallic compound and the (B) oxygen containing compound are reacted together prior to contact with the inert support.

All references to the Periodic Table are to the Periodic Table of the Elements printed on page B-3 of the 56th Edition of Handbook of Chemistry and Physics, CRC Press (1975).

In a second embodiment of this invention there is provided a catalyst system comprising the transition metal containing solid catalyst component and an organoaluminum cocatalyst for the polymerization of alpha-olefins using the catalyst of this invention under conditions characteristic of Ziegler polymerization.

In view of the high activity of the catalyst system prepared in accordance with this invention as compared with conventional Ziegler catalysts, it is generally not necessary to deash polymer product since polymer product will generally contain lower amounts of catalyst residues than polymer product produced in the presence of conventional catalyst.

The catalyst systems can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene and hexene, butadiene, 1,4-pentadiene and the like so as to form copolymers of low and medium densities. The supported catalyst system is particularly useful for the polymerization of ethylene and copolymerization of ethylene with other alpha-olefins in gas phase processes.

DESCRIPTION OF THE PREFERRED EMBODIMENTS

Briefly, the catalyst components of the present invention comprises the solid reaction product of (A) an organometallic compound, (B) an oxygen containing compound, (C) an acyl halide, (D) at least one transition metal compound and (E) a Group IIIa metal hydrocarbyl dihalide in the presence of an oxide support material. According to the polymerization process of this invention, ethylene, at least one alpha-olefin having 3 or more carbon atoms or ethylene and other olefins or diolefins having terminal unsaturation are contacted with the catalyst under polymerizing conditions to form a commercially useful polymeric product. Typically, the support can be any of the solid particulate porous supports such as talc, zirconia, thoria, magnesia, and titania. Preferably the support material is a Group IIa, IIIa, IVa and IVb metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, $SiCl_4$, chlorosilanes, silylamines and the like. The chemical dehydration is accomplished by slurrying the inorganic particulate material, such as, for example, silica in an inert low boiling hydrocarbon, such as, for example, heptane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature ranges during chemical dehydration reaction can be from about 25° C. to about 120° C., however, higher and lower temperatures can be employed. Preferably the temperature will be about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred (A) organometallic compounds employed in this invention are the inert hydrocarbon soluble organomagnesium compounds represented by the formula $R^1MgR^2$ wherein each or $R^1$ and $R^2$ which may be the same or different are alkyl groups, aryl groups, cycloalkyl groups, aralkyl groups, alkadienyl groups or alkenyl groups. The hydrocarbon groups $R^1$ or $R^2$ can contain between 1 and 20 carbon atoms and preferably from 1 to about 10 carbon atoms. Illustrative but non-limiting examples of magnesium compounds which may be suitably employed in accordance with the invention are dialkylmagnesiums such as diethylmagnesium, dipropylmagnesium, di-isopropylmagnesium, di-n-butyl-magnesium, di-isobutylmagnesium, diamylmagnesium, dioctylmagnesium, di-n-hexylmagnesium, didecylmagnesium, and didodecylmagnesium; dicycloalkylmagnesium, such as dicyclohexylmagnesium; diarylmagnesium such as dibenzylmagnesium, ditiolylmagnesium and dixylylmagnesium.

Preferably the organomagnesium compounds will have from 1 to 6 carbon atoms and most preferably $R^1$ and $R^2$ are different. Illustrative examples are ethylpropylmagnesium, ethyl-n-butylmagnesium, amylhexylmagnesium, n-butyl-s-butylmagnesium, and the like. Mixtures of hydrocarbyl magnesium compounds may be suitably employed such as for example dibutyl magnesium and ethyl-n-butyl magnesium.

The magnesium hydrocarbyl compounds are as generally obtained from commercial sources as mixtures of the magnesium hydrocarbon compounds with a minor amount of an aluminum hydrocarbyl compound. The minor amount of aluminum hydrocarbyl is present in order to facilitate solubilization of the organomagnesium compound in a hydrocarbon solvent. The hydrocarbon solvent usefully employed for the organomagnesium can be any of the well known hydrocarbon liquids, for example hexane, heptane, octane, decane, dodecane, or mixtures thereof as well as aromatic hydrocarbons such as benzene, toluene, xylenes, etc.

The organomagnesium complex with a minor amount of aluminum alkyl can be represented by the formula $(R^1MgR^2)_p(R_n^8Al)_s$ wherein $R^1$ and $R^2$ are defined as above and $R^8$ has the same definition, n is an integer from 1 to 3, p is greater than 0, and the ratio of $s/s+p$ is from 0 to 1, preferably from 0 to about 0.7 and most desirably from about 0 to 0.1.

Illustrative examples of the magnesium aluminum complexes are $[(n-C_4H_9)(C_2H_5)Mg][(C_2H_5)_3Al]_{0.02}$, $[(nC_4H_9)_2Mg][(C_2H_5)_3Al]_{0.013}$, $[nC_4H_9)_2Mg][(C_2H_5)_3Al]_{2.0}$ and $[(nC_6H_{13})_2Mg][(C_2H_5)_3Al]_{0.01}$. A suitable magnesium aluminum complex is Magala ® BEM manufactured by Texas Alkyls, Inc.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. Nos. 3,737,393 and 4,004,071 which are incorporated herein by reference. However, any other suitable method for preparation of organometallic compounds can be suitably employed.

The oxygen containing compounds which may be usefully employed in accordance with this invention are alcohols, aldehydes, siloxanes and ketones. Preferably the oxygen containing compounds are selected from alcohols and ketones represented by the formulas $R^3OH$ and $R^4COR^5$ wherein $R^3$ and each or $R^4$ and $R^5$ which may be the same or different can be alkyl groups, aryl groups, cycloalkyl groups, aralkyl groups, alkadienyl groups, or alkenyl groups having from 2 to 20 carbon atoms. Preferably the R groups will have from 2 to 10 carbon atoms. Most preferably the R groups are alkyl groups and will have from 2 to 6 carbon atoms. Illustrative examples of alcohols which may be usefully employed in accordance with this invention are ethanol, isopropanol, 1-butanol, t-butanol, 2-methyl-1-pentanol, 1-pentanol, 1-dodecacanol, cyclobutanol, benzyl alcohol, and the like; diols, such as 1,6-hexanediol, and the like with the proviso that the dial be contacted with the magnesium compound subsequent to the magnesium compound treatment of the support material. Most preferably the alcohol will contain from 1 to 4 carbon atoms. The most preferred alcohol is 1-butanol.

The ketones will preferably have from 3 to 11 carbon atoms. Illustrative ketones are methyl ketone, ethyl ketone, propyl ketone, n-butyl ketone and the like. Acetone is the ketone of choice.

Illustrative of the aldehydes which may be usefully employed in the preparation of the organomagnesium compound include formaldehyde, acetaldehyde, propionaldehyde, butanal, pentanal, hexanal, heptanal, octanal, 2-methylpropanal, 3-methylbutanal, acrolein, crotonaldehyde, benzaldehyde, phenylacetaldehyde, o-tolualdehyde, m-tolualdehyde, and p-tolualdehyde.

Illustrative of the siloxanes which may be usefully employed in the preparation of the organomagnesium compound include hexamethyldisiloxane, octamethyltrisiloxane, octamethylcyclotetrasiloxane, decamethylcyclopentasiloxane, sym-dihydrotetramethyldisiloxane, pentamethyltrihydrotrisiloxane, methylhydrocyclotetrasiloxane, both linear and branched polydimethylsiloxanes, polymethylhydrosiloxanes, polyethylhydrosiloxanes, polymethylethylsiloxanes, polymethyloctylsiloxanes, and polyphenylhydrosiloxanes.

Any of the acyl halides may be usefully employed in accordance with this invention. The hydrocarbon portion of the acyl halides which can have from 1–20 carbon atoms can be an alkyl group, substituted alkyl group, aryl group, substituted aryl group, cycloalkyl group, alkadienyl group or alkenyl group.

The preferred acyl halides can be represented by the formula $R^9COX$ wherein $R^9$ can be $C_1$ to $C_{20}$ alkyl group, substituted alkyl group, aryl group, substituted aryl group, or cycloalkyl group and X is a halogen. The preferred halogen is chlorine.

Illustrative but non-limiting examples of the acyl halides which can be employed in this invention are acetyl chloride, propanoyl chloride, butyryl chloride, butyryl bromide, isobutyryl chloride, benzoyl chloride, oleoyl chloride, acryloyl chloride, 6-hepteneoyl chloride, heptanoyl chloride, cyclohexanecarbonyl chloride, cyclopentanepropionyl chloride and the like. Acid chlorides based on polyacids may also usefully be employed such as, for example, dodecanedioyl chloride, succinyl chloride, camphoryl chloride, terephthalloyl chloride and the like. The preferred acid halides are acetyl chloride, benzoyl chloride, and p-methylbenzoyl chloride.

The transition metal compounds of a Group IVa, Va, VIa or a metal which can be usefully employed in the preparation of the transition metal containing catalyst component of this invention are well known in the art. The transition metals which can be employed in accordance with this invention may be represented by the formulas $TrX'_{4-q}(OR^6)_q$, $TrX'_{4-q}R_q^7$, $VOX'_3$ and $VO(OR^6)_3$. Tr is a Group IVb, Vb, VIb, VIIb, and VIII metal, preferably Group IVb and Vb metals and preferably titanium, vanadium or zirconium, q is 0 or a number equal to or less than 4, X' is halogen, $R^6$ is a hydrocarbyl or substituted hydrocarbyl group, for example, alkyl, aryl or cycloalkyl having from 1 to 20 carbon atoms and $R^7$ is an alkyl group, aryl group, aralkyl group, substituted aralkyl group, 1,3-cyclopentadienyls and the like. The alkyl, aryl, aralkyls and substituted aralkyls contain from 1 to 20 carbon atoms preferably 1 to 10 carbon atoms. Mixtures of the transition metal compounds can be employed if desired.

Illustrative examples of the transition metal compounds include: $TiCl_4$, $TiBr_4$, $Ti(OCH_3)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$.

As indicated above, mixtures of the transition metal compounds may be usefully employed, no restriction being imposed on the number of transition metal compounds which may be reacted with the organometallic composition. Any halogenide and alkoxide transition metal compound or mixtures thereof can be usefully employed. The titanium tetrahalides are especially preferred with titanium tetrachloride being most preferred.

The Group III hydrocarbyl dihalides are at least employed in the last step of the transition metal containing catalyst component. Preferably the Group III metal hydrocarbyl dihalides are selected from the boron and aluminum alkyl dihalides. The alkyl group can have from 1 to 12 carbon atoms.

Illustrative, but non-limiting examples of the Group III metal alkyl halides are methyl aluminum dichloride, ethyl aluminum dichloride, propyl aluminum dichloride, butyl aluminum dichloride, isobutyl aluminum dichloride, pentyl aluminum dichloride, neopentyl aluminum dichloride, hexyl aluminum dichloride, octyl aluminum dichloride, decyl aluminum dichloride, dodecyl aluminum dichloride, methyl boron dichloride, ethyl boron dichloride, propyl boron dichloride, butyl boron dichloride, isobutyl boron dichloride, pentyl boron dichloride, neopentyl boron dichloride, hexyl boron dichloride, octyl boron dichloride, decyl boron dichloride and the like. The preferred Group III metal alkyl dihalides are ethyl aluminum dichloride and ethyl boron dichloride. Preferably, the treatment with the Group III metal alkyl dihalides will be from about 4 hours to 16 hours, however, greater or lesser time can be used for the treatment.

The treatment of the support material as mentioned above is conducted in an inert solvent. The inert solvents can also be usefully employed to dissolve the individual ingredients prior to the treatment step. Preferred solvents include mineral oils and the various hydrocarbons which are liquid at reaction temperatures and in which the individual ingredients are soluble. Illustrative examples of useful solvents include the alkanes such as pentane, iso-pentane, hexane, heptane, octane and nonane; cycloalkanes such as cyclopentane, cyclohexane; and aromatics such as benzene, toluene, ethylbenzene and diethylbenzene. The amount of solvent to be employed is not critical. Nevertheless, the amount should be employed so as to provide adequate heat transfer away from the catalyst components during reaction and to permit good mixing.

The organometallic component employed in step (A) either as the organometallic compound or its reaction product with the oxygen containing compound is preferably added to the inert solvent in the form of a solution. Preferred solvents for the organometallic compositions are the alkanes such as hexane, heptane, octane and the like. However, the same solvent as employed for the inert particulate support material can be employed for dissolving the organometallic composition. The concentration of the organometallic composition in the solvent is not critical and is limited only by handling needs.

The amounts of materials usefully employed in the solid catalyst component can vary over a wide range. The concentration of magnesium deposited on the essentially dry, inert support can be in the range from about 0.1 to about 2.5 millimoles/g of support, however, greater or lesser amounts can be usefully employed. Preferably, the organo magnesium compound concentration is in the range of 0.5 to 2.0 millimoles/g of support and more preferably in the range of 1.0 to 1.8 millimoles/g of support. The magnesium to oxygen-containing compound mole ratio can range from about 0.01 to about 2.0. Preferably, the ratio is in the range 0.5 to 1.5, and more preferably in the range 0.8 to 1.2. The upper limit on this range is dependent on the choice of oxygen-containing compound and the mode of addition. When the oxygen-containing compound is not premixed with the magnesium compound, that is, when it is added to the support before the magnesium compound or after the magnesium compound, the ratio may range from 0.01 to 2.0. When premixed with the organomagnesium compound, the hydrocarbyl groups on the oxygen-containing compound must be sufficiently large to insure solubility of the reaction product. Otherwise the ratio of oxygen-containing compound to organomagnesium compound ranges from 0.01 to 1.0, most preferably 0.8 to 1.0. The amount of acyl halide employed should be such as to provide a mole ratio of about 0.1 to about 10 and preferably 0.5 to about 2.5 with respect to the magnesium compound. Preferably the mole ratio will be from about 1 to about 2.

The Group IIIa metal hydrocarbyl dihalide employed can be in the range of about 0.1 to about 10 mmoles per mole of magnesium compound with a preferred range of from 0.5 to 5.0. The transition metal compound is added to the inert support at a concentration of about 0.01 to about 1.5 millimoles Ti/g of dried support, preferably in the range of about 0.05 to about 1.0 millimoles Ti/g of dried support and especially in the range of about 0.1 to 0.8 millimoles Ti/g of dried support.

Generally, the individual reaction steps can be conducted as temperatures in the range of about −50° C. to about 150° C. Preferred temperature ranges are from about −30° C. to about 60° C. with −10° C. to about 50° C. being most preferred. The reaction time for the individual treatment steps can range from about 5 minutes to about 24 hours. However, lesser or greater times can be employed. Preferably the reaction time will be from about ½ hour to about 8 hours. During the reaction constant agitation is desirable.

In the preparation of the titanium containing catalyst component washing after the completion of any step may be effected. However, it is generally found that the advantages of the catalyst system are diminished by washing until the last step. The catalyst component prepared in accordance with this invention are usefully employed with the cocatalyst well known in the art of the Ziegler catalysis for polymerization of olefins.

Typically, the cocatalysts which are used together with the transition metal containing catalyst component are organometallic compounds of Group Ia, IIa, IIIa metals such as aluminum alkyls, aluminum alkyl hydrides, lithium aluminum alkyls, zinc alkyls, magnesium alkyls and the like. The cocatalysts desirably used are the organoaluminum compounds. The preferred alkylaluminum compounds are represented by the formula AlR'''$_n$X''$_{3-n}$ wherein R''' is hydrogen, hydrocarbyl or substituted hydrocarbyl group and X'' is halogen. Preferably R''' is an alkyl group having from 2 to 8 carbon atoms. Illustrative examples of the cocatalyst material are ethyl aluminum dichloride, ethyl aluminum sesquichloride, diethyl aluminum chloride, aluminum triethyl, aluminum tributyl, diisobutyl aluminum hydride, diethyl aluminum ethoxide and the like. Aluminum trialkyl compounds are most preferred with triisobutylaluminum being highly desirable.

The catalyst system comprising the aluminum alkyl cocatalyst and the transition metal containing catalyst component is usefully employed for the polymerization of ethylene, other alpha-olefins having from 3 to 20 carbon atoms, such as for example, propylene, butene-1, pentene-1, hexene-1, 4 methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst may be usefully employed to produce polyethylene or copolymers of ethylene by copolymerizing with other alpha-olefins or diolefins, particularly propylene, butene-1, pentene-1, hexene-1, and octene-1. The olefins can be polymerized in the presence of the catalysts of this invention by any suitable known process such as, for example, suspension, solution and gas-phase polymerization processes.

The polymerization reaction employing catalytic amounts of the above-described catalyst can be carried out under conditions well known in the art of Ziegler polymerization, for example, in an inert diluent at a temperature in the range of 50° C. to 100° C. and a pressure of 2 and 40 atmospheres, in the gas phase at a temperature range of 70° C. to 100° C. at about 5 atmospheres and upward. Illustrative of the gas-phase processes are those disclosed in U.S. Pat. No. 4,302,565 and U.S. Pat. No. 3,302,566 which references are incorporated by reference. As indicated above, one advantageous property of the catalyst system of this invention is the reduced amount of gas phase reactor fouling. The catalyst system can also be used to polymerize olefins at single phase conditions, i.e., 150° C. to 320° C. and 1,000–3,000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In the Examples following the silica support was prepared by placing Davison Chemical Company G-952 silica gel in a vertical column and fluidizing with an upward flow of $N_2$. The column was heated slowly to 600° C. and held at that temperature for 12 hours after which the silica was cooled to ambient temperature.

The melt index (MI) and melt index ratio were measured in accordance with ASTM test D1238. The resin density was determined by density gradient column according to ASTM test D1505. The bulk density was determined by allowing approximately 120 cc of resin to fall from the bottom of a polyethylene funnel across a gap of 1 inch into a tared 100 cc plastic cylinder (2.6 cm in diameter by 19.0 cm high). The funnel bottom was covered with a piece of cardboard until the funnel was filled with the sample. The entire sample was then allowed to fall into the cylinder. Without agitating the sample, excess resin was scraped away so that the container was completely filled without excess. The weight of resin in the 100 cc cylinder was determined. This measurement was repeated three times and the average value reported.

EXAMPLE 1

Catalyst Preparation

Into a vial containing 20 ml of hexane there was injected 10 ml of butylethylmagnesium (BEM) (6.8 mmoles Mg) to the solution was added 0.5 ml (6.8 mmoles) of n-butanol. The mixture was allowed to react at room temperature for 1.5 hours. The solution was added to a vial containing 3.5 g of the Davison 952 silica and reacted with the silica for 1 hour at room temperature. To the reaction mixture was added with stirring 6.8 mmoles of benzoyl chloride. The reaction mixture was stirred at room temperature for 1 hour. To the slurry there was added 2.3 mmoles TiCl$_4$ and the treatment was continued for 1 hour. Ethyl aluminum dichloride (15.7 mmoles Al) was added and the reaction continued for 1 hour. The catalyst turned light brown. The catalyst was filtered, washed 3 times with hexane and dried in vacuo.

Polymerization

To a 1.8 liter reactor there was added 800 cc of hexane, 0.10 g of the titanium containing solid catalyst component, triisobutyl aluminum cocatalyst in an amount so as to provide an aluminum to titanium ratio of 50 mmoles. The vessel was pressured to 30 psig with H$_2$, 45 cc of 1-butene was added and the vessel was thereafter pressured to 150 psig with ethylene. The vessel was heated to 85° C. and polymerization was maintained for 40 minutes. The results of the polymerization are summarized in Table 1.

EXAMPLE 2

The titanium containing product was prepared identically as in Example 1 with the exception that octanol was used in place of butanol. The polymerization conditions were identical to that in Example 1. The results of the polymerization are summarized in Table 1.

EXAMPLE 3

The titanium containing solid was prepared identically as in Example 1 with the exception that acetyl chloride was used in place of benzoyl chloride. The polymerization was performed as in Example 1. The results are summarized in Table 1.

EXAMPLE 4

The titanium containing solid product was prepared identically as in Example 1 with the exception that the ethyl aluminum dichloride reaction was maintained for 16 hours and the polymerization conditions were as in Example 1 with the exception that 1-butene was omitted and polymerization time was maintained for 90 minutes. The results of the polymerization are summarized in Table 1.

EXAMPLE 5

The titanium containing solid product was prepared identically as in Example 4. The polymerization was as in Example 4 with the exception that the polymerization time was maintained for 40 minutes.

EXAMPLE 6

The titanium containing solid catalyst component was prepared identically as in Example 1 with the ethyl aluminum dichloride reaction time maintained for 1 hour. The polymerization was performed as in Example 4. The results of the polymerization are summarized in Table 1.

COMPARATIVE EXAMPLE 1

The catalyst was prepared identically as in Example 1 with the exception that BEM was added directly to the silica in the absence of any butanol or acyl halide addition. The polymerization was performed as in Example 1. The results of the polymerization are summarized in Table 1.

COMPARATIVE EXAMPLE 2

The titanium containing solid catalyst component was prepared identically as in Example 1 with the exception that the EADC ? ? ? ? treatment was omitted. The polymerization was performed as in Example 1. The results of the polymerization are summarized in Table 1.

TABLE I

| Formulation | Specific Activity (Kg PE/g Ti-hr-atm) | MI (g/10 min) | MIR (HLMI/MI) | Polymer Density (g/ml) | Bulk Density (lb/ft$^3$) |
|---|---|---|---|---|---|
| (1) Silica + (BEM + BuOH) + BzCl + TiCl$_4$ + EADC | 50.2 | 4.40 | 26.7 | 0.9322 | — |
| (2) Silica + (BEM + Octanol) + BzCl + TiCl$_4$ + EADC | 79.2 | 10.2 | 26.7 | 0.9244 | chunks |
| (3) Silica + (BEM + BuOH) + AcCl + TiCl$_4$ + EADC | 71.1 | 2.87 | 28.6 | 0.9243 | chunks |
| (4) Silica + (BEM + BuOH) + BzCl + TiCl$_4$ + EADC | 12.0 | 0.87 | 33.0 | Hi-density | 26.0 |
| (5) Silica + (BEM + BuOH) + BzCl + TiCl$_4$ + EADC | 12.0 | 0.13 | 32.8 | Hi-density | 17.5 |
| (6) Silica + (BEM + BuOH) + BzCl + TiCl$_4$ + EADC | 12.0 | — | — | — | 21.0 |
| (Comp. 1) Silica + BEM + TiCl$_4$ + EADC | 19.2 | 3.10 | 26.0 | 0.9350 | 20.0 |
| (Comp. 2) Silica + (BEM + BuOH) + BzCl + TiCl$_4$ | 14.2 | 1.77 | 25.7 | 0.9379 | 17.5 |

What is claimed is:

1. A process for the polymerization of ethylene and alpha-olefins having from 1 to 20 carbon atoms or mixtures of ethylene, alpha-olefins and diolefins which process comprises polymerizing in the presence of a catalyst system comprising (a) an organo aluminum compound of the formula AlR''$_n$X''$_{3-n}$ wherein R'' is hydrogen or a hydrocarbyl group having from 1 to 20 carbon atoms, X is halogen and n is a number from 1 to 3, and (b) a transition metal containing catalyst component comprising the solid reaction product obtained by treating an inert solid support material in an inert solvent sequentially with (A) an organometallic compound of a Group IIa, IIb or IIIa metal wherein all the metal valencies are satisfied with a hydrocarbon group, (B) an oxygen containing compound selected from ketones, aldehydes, alcohols or mixtures thereof, (C) an acyl halide, (D) at least one transition metal compound of a Group IVb, Vb, VIb or VIII metal, (E) a Group IIIa metal hydrocarbyl dihalide with the proviso that the inert solid support material can alternatively be treated with (i) the (A) organometallic compound and the (B) oxygen containing compound simultaneously, (ii) the reaction product of the (A) organometallic compound and (B) oxygen containing compound or (iii) the (B)

oxygen containing compound followed by treating with the (A) organometallic compound.

2. The process as in claim 1 wherein the (A) organometallic compound is a dihydrocarbon magnesium compound represented by $R^1MgR^2$ wherein $R^1$ and $R^2$ which can be the same or different are selected from alkyl groups, aryl groups, cycloalkyl groups, aralkyl groups, alkaienyl groups or alkenyl groups, the (B) oxygen containing compounds are selected from alcohols and ketones represented by the formula $R^3OH$ and $R^4COR^5$ wherein $R^3$ and each of $R^4$ and $R^5$ which may be the same or different can be an alkyl group, aryl group, cycloalkyl group, aralkyl group, alkadienyl group or alkenyl group and the (C) acyl halide is represented by the formula $R^8COX$ wherein $R^8$ can be an alkyl group, cycloalkyl group or aryl group having from 1 to 12 carbon atoms and X is halogen and the Group IIIa hydrocarbyl metal dihalide is one of alkyl boron dihalide, alkyl aluminum dihalide or mixtures thereof.

3. The process as in claim 2 wherein the inert solid support material is one of silica, alumina, magnesia or mixtures thereof.

4. The process as in claim 2 wherein $R^1$, $R^2$, $R^3$, $R^4$, and $R^5$ are alkyl groups having from 1 to 10 carbon atoms.

5. The process as in claim 2 wherein $R^1$ and $R^2$ are different.

6. The process as in claim 5 wherein $R^1$, $R^2$ and $R^3$ are alkyl groups having from 1 to 6 carbon atoms.

7. The process as in claim 6 wherein $R^1$ is butyl.

8. The process as in claim 7 wherein $R^2$ is ethyl.

9. The process as in claim 2 wherein the Group IIIa alkyl metal dihalide is one of ethyl boron dichloride or ethyl aluminum dichloride.

10. The process as in claim 9 wherein the oxygen containing component is an alcohol having from 1–4 carbon atoms.

11. The process as in claim 10 wherein $R^3$ is butyl.

12. The process as in claim 2 wherein $R^8$ is an alkyl group having from 1–6 carbon atoms or a phenyl group having from 7–10 carbon atoms and X is chlorine.

13. The process as in claim 12 wherein $R^8$ is methyl or phenyl.

14. The process as in claim 2 wherein the transition metal compound or mixtures thereof is represented by the formula $TrX'_{4-q}(OR^6)_q$, $TrX'_{4-q}R_q^7$, $VOX'_3$ or $VO(OR^6)_3$ wherein Tr is a transition metal, $R^6$ is a hydrocarbyl group having from 1 to 20 carbon atoms, $R^7$ is an alkyl group, aryl group or aralkyl group having from 1 to 20 carbon atoms or a 1,3-cyclopentadienyl, X' is halogen and q is 0 or a number equal to or less than 4.

15. The process as in claim 14 wherein Tr is titanium, vanadium or zirconium.

16. The process as in claim 15 wherein the transition metal compound is $TiCl_4$.

17. The process as in claim 2 wherein the organomagnesium compound and the oxygen containing compound are reacted together prior to contact with the inert support material.

18. The process as in claim 17 wherein the oxygen containing compound is an alkyl alcohol having from 1 to 4 carbon atoms and the magnesium containing compound is ethyl-n-butylmagnesium.

19. The process as in claim 2 wherein the $R^8$ is an alkyl group having from 1 to 6 carbon atoms or a phenyl group having from 7 to 10 carbon atoms and X is chlorine.

* * * * *